(No Model.)
S. C. GRANGER.
APPARATUS FOR THE MANUFACTURE OF CORN SIRUP.
No. 271,235. Patented Jan. 30, 1883.
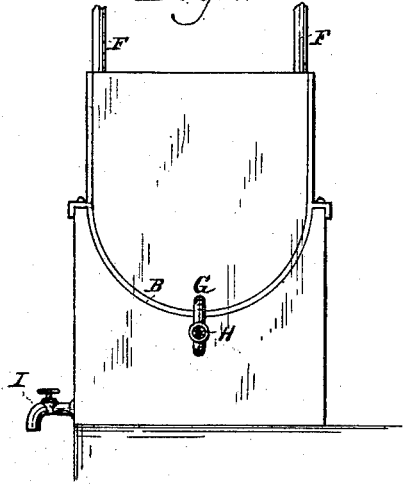
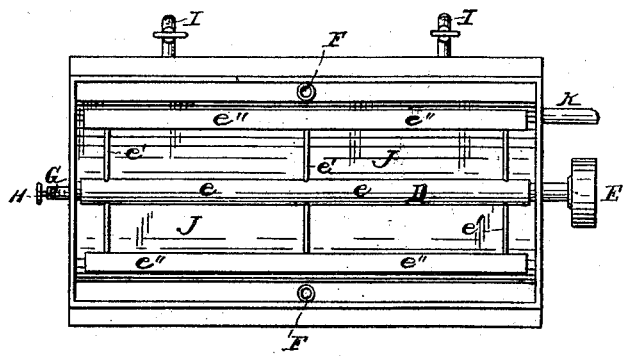
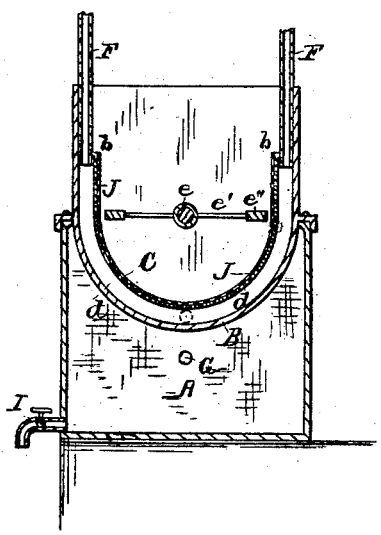
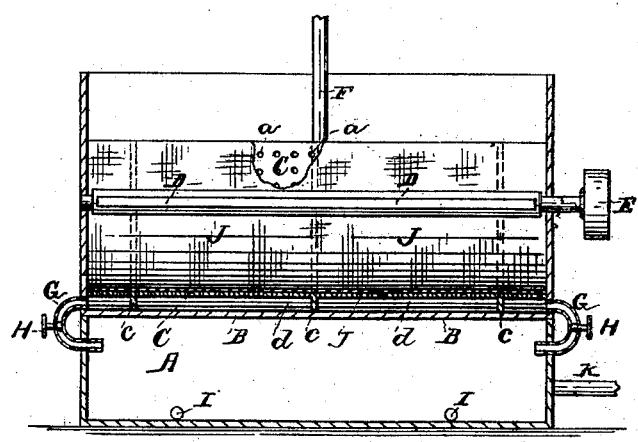
Witnesses.
Henry Frankfurter,
P. F. Moran,
Inventor.
Sumner C. Granger
per Gridley & Co.
his Attorneys.

United States Patent Office.

SUMNER C. GRANGER, OF SOUTH CHICAGO, ILLINOIS, ASSIGNOR OF ONE-HALF TO JOSEPH SNYDER, OF SAME PLACE.

APPARATUS FOR THE MANUFACTURE OF CORN-SIRUP.

SPECIFICATION forming part of Letters Patent No. 271,235, dated January 30, 1883.

Application filed August 24, 1882. (No model.)

*To all whom it may concern:*

Be it known that I, SUMNER C. GRANGER, of South Chicago, in the county of Cook and State of Illinois, have invented certain new and useful Improvements in Apparatus for the Manufacture of Corn-Sirup, of which the following, in connection with the accompanying drawings, is a specification.

In the drawings, Figure 1 is an end view of an apparatus embodying my invention. Fig. 2 is a top or plan view of the same. Fig. 3 is a vertical central cross-section, and Fig. 4 is a vertical central longitudinal section, thereof.

Like letters of reference indicate like parts.

A represents the lower chamber or sirup-reservoir, and B is the top of the said chamber. The chamber A, excepting as hereinafter set forth, is intended to be air and water tight, and the top thereof is semicircular, as shown, and its walls extend vertically above the walls of the chamber A, forming a continuation thereof, as is plainly indicated in Figs. 1 and 3. These two parts, A and B, may be connected to each other in any suitable or well-known way, it being understood that the joint between the said parts should be air-tight, or as nearly so as may be practicable.

C is a strainer, consisting, by preference, of sheet metal, having therein the perforations *a a*. The upper edges of the strainer C are flanged, as shown at *b b*, and *c c* are ribs on the under side of the said strainer. The strainer C is formed to set into the top piece, B, of the reservoir A, being supported therein by the ribs *c c*, which rest fittingly on the said top piece, thus forming between the strainer and the part B a considerable space, *d*, as shown in Figs. 3 and 4. It will be perceived that the strainer C approximates the part B as to curvature of form.

D is an agitator journaled in the ends of the reservoir A. This agitator has upon one of its exposed ends a drive-wheel, E. In the example shown the agitator consists of a shaft, *e*, from which arms *e' e'* project, and *e'' e''* are beater-arms attached to the ends of the arms *e' e'*.

F F are air-tubes entering the flanges *b b*. These tubes I provide with cocks for closing them, as occasion may require; but I have not here shown such cocks, as their construction and operation are well known.

G G are bent tubes, the upper ends of which enter the space *d*, and the lower ends of which enter the reservoir A, as is clearly indicated in Fig. 4.

H H are cocks or shut-offs in the other or exposed parts of the tubes G G.

I I are faucets entering the lower part of the chamber or reservoir A.

J is a piece of flannel or other similar material covering the strainer C. This flannel or cover is removable from the strainer.

I do not make any substantial departure from the ordinary method of proceeding in manufacturing corn-sirup, excepting that I employ the removable cover or cloth J to prevent the closing of the perforations in the strainer C by the contents of the tub while they are in their starchy state or condition. After full conversion takes place I remove the cover J by drawing it out from the strainer. Also, to aid in drawing off the sugar-water from the mass or mash in the strainer into the reservoir A, I employ an air-pump, by means of which I produce a partial vacuum or suction, the said pump being connected properly for that purpose to a tube entering the said reservoir. Such a pump I do not here show, as any common or well-known air-pump so connected may serve the purpose referred to. Neither have I here shown a special tube for the purpose of connecting an air-pump to the reservoir A, as any suitable connecting-tube connected to the said pump and to one of the faucets I I will suitably connect the pump and the reservoir. It is to be understood, of course, that the pipes F F are to be closed when the air-pump is employed for the purpose of effectually draining off the liquid matter from the mash, and that the cover J should also then be removed.

By using an air-pump in connection with an apparatus constructed substantially as now described nearly all the fluid matter will be drawn from the mash, the effect being somewhat the same as if a press should be employed for the same purpose. In fact, the atmospheric pressure forces out the fluid contents when a partial vacuum is produced in the reservoir A, in the manner described. The sugar-sirup thus extracted flows into the reservoir A through the pipes G G. K is a pipe leading to an evaporator.

This apparatus, as will be perceived, performs the functions of a mash-tub, converter, separator, vacuum-press, and rectifier, and may be employed with advantage in the manufacture of lager-beer.

Having thus described my invention, what I claim as new, and desire to secure by Letters Patent, is—

1. The combination, in an apparatus for extracting the sugar-sirup from grain, of the air-tight chamber or reservoir A, the perforated strainer C, the removable sheet of cloth J, and the rotary agitator D, all arranged substantially as shown and described, and for the purposes set forth.

2. The combination, in an apparatus for extracting the sugar-sirup from grain, of the air-tight chamber or reservoir A and the strainer C, the said strainer having between it and the top of the said chamber an air-space, $d$, communicating with the said chamber by means of air tubes or ducts, whereby a suction or pressure may be produced upon the mash on the strainer, substantially as and for the purposes specified.

3. The combination, in an apparatus for extracting the sugar-sirup from grain, of the downwardly-curved strainer C, the rotary agitator, and the air-tight chamber A, located below the said strainer and communicating with an air-space thereunder, substantially as and for the purposes specified.

In testimony whereof I have hereunto signed my name this 10th day of August, A. D. 1882.

SUMNER C. GRANGER.

Witnesses:
H. FRANKFURTER,
M. M. GRIDLEY.